US010262122B2

(12) United States Patent
Orihara et al.

(10) Patent No.: US 10,262,122 B2
(45) Date of Patent: Apr. 16, 2019

(54) ANALYSIS APPARATUS, ANALYSIS SYSTEM, ANALYSIS METHOD, AND ANALYSIS PROGRAM

(71) Applicant: NIPPON TELEGRAPH AND TELEPHONE CORPORATION, Chiyoda-ku (JP)

(72) Inventors: Shingo Orihara, Musashino (JP); Hiroshi Asakura, Musashino (JP); Yang Zhong, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 15/518,157

(22) PCT Filed: Oct. 22, 2015

(86) PCT No.: PCT/JP2015/079796
§ 371 (c)(1),
(2) Date: Apr. 10, 2017

(87) PCT Pub. No.: WO2016/068007
PCT Pub. Date: May 6, 2016

(65) Prior Publication Data
US 2017/0308688 A1    Oct. 26, 2017

(30) Foreign Application Priority Data

Oct. 28, 2014 (JP) .................................. 2014-219276

(51) Int. Cl.
*G06F 21/55* (2013.01)
*G06F 21/31* (2013.01)
(Continued)

(52) U.S. Cl.
CPC ............ *G06F 21/316* (2013.01); *G06F 21/55* (2013.01); *G06F 21/577* (2013.01);
(Continued)

(58) Field of Classification Search
CPC ...... G06F 21/316; G06F 21/55; G06F 21/552; G06F 21/577; G06F 2221/2101;
(Continued)

(56) References Cited

U.S. PATENT DOCUMENTS 7,032,026 B1 *  4/2006  Biswas ................. H04L 63/083
                                                         709/201
8,312,540 B1 * 11/2012  Kahn .................... G06F 21/552
                                                         713/183

(Continued)

FOREIGN PATENT DOCUMENTS

JP       9-212458 A    8/1997
JP    2010-79562 A    4/2010

OTHER PUBLICATIONS

"InfoCage SiteShell Ver2.0.1 Password List Kogeki Taisaku Settei Tejunsho", NEC Corporation, Total 31 Pages, (Nov. 9, 2015).
(Continued)

*Primary Examiner* — Minh Dinh
(74) *Attorney, Agent, or Firm* — Oblon, McClelland, Maier & Neustadt, L.L.P.

(57) ABSTRACT

An analysis apparatus analyzes access logs including authentication results and authentication information of users, and includes: a calculation unit that calculates a similarity between pieces of authentication information in two consecutive access logs when access logs of the same access source, from the access logs, are chronologically arranged, and presumes that a piece of authentication information of the access logs of the user has been input by a human if the calculated similarity is equal to or greater than
(Continued)

a predetermined value; and a risk determination unit that determines that there is a possibility that the access source in the access logs is being an attack source if an authentication result of any of the two access logs is authentication failure and the calculation unit presumes that any piece of authentication information of the two access logs has not been input by a human.

9 Claims, 8 Drawing Sheets

(51) Int. Cl.
*H04L 29/06* (2006.01)
*G06F 21/57* (2013.01)
(52) U.S. Cl.
CPC .. *H04L 63/1441* (2013.01); *G06F 2221/2101* (2013.01); *G06F 2221/2151* (2013.01); *H04L 63/083* (2013.01); *H04L 63/1408* (2013.01); *H04L 63/1425* (2013.01)
(58) Field of Classification Search
CPC ........... G06F 2221/2151; H04L 63/083; H04L 63/1408; H04L 63/1425; H04L 63/1441
See application file for complete search history.

(56) References Cited

U.S. PATENT DOCUMENTS

| | | | | |
|---|---|---|---|---|
| 2007/0005985 A1* | 1/2007 | Eldar | ................... | G06Q 20/206 713/183 |
| 2008/0060078 A1* | 3/2008 | Lord | ..................... | G06F 21/552 726/26 |
| 2009/0031406 A1* | 1/2009 | Hirose | ................ | H04L 63/1441 726/7 |
| 2015/0106930 A1* | 4/2015 | Honda | ................ | H04L 63/1425 726/23 |

OTHER PUBLICATIONS

"Measures to Deal With Unauthorized Login by List Based Account Hacking (Collection of Measures for Internet Service Providers such as Site Administrators", [online], http://www.soumu.go.jp/main_content/000265403.pdf, Total 18 Pages, (Retrieval Date Oct. 7, 2014).
"How to Protect Oneself From Threats That Are Getting More Sophisticated, such as Advanced Persistent Threat and Unauthorized Login", [online], http://www.atmarkit.co.jp/alt/articles/1406/27/news012.html, Total 14 Pages, (Retrieval Date Oct. 7, 2014).
Hiroshi Tokumaru, "Systematically Learning How to Make Safe Web Applications", SB Creative Corporation, Total 1 Page, (Mar. 2011).
"Unlocking Lockout of User Account", [online], http://www.atmarkit.co.jp/alt/articles/0311/29/news005.html, Total 5 Pages, (Retrieval Date Oct. 7, 2014).
"Block Unauthorized Login! Authentication Enhancement by OpenAM", [online], http://atmarkit.co.jp/alt/article/1310/17/news003.html, Total 15 Pages, (Retrieval Date Oct. 7, 2014).
International Search Report dated Nov. 17, 2015 in PCT/JP2015/079796 Filed Oct. 22, 2015.

* cited by examiner

ANALYSIS APPARATUS, ANALYSIS SYSTEM, ANALYSIS METHOD, AND ANALYSIS PROGRAM

FIELD

The present invention relates to an analysis apparatus, an analysis system, an analysis method, and an analysis program.

BACKGROUND

Conventionally, the majority of unauthorized login attacks have been those carried out by a round robin method, which is called brute force attack, such as: those carried out through a round robin of ID/password (ID/PWD) combinations; or those carried out by preparation of a particular word dictionary and a round robin therethrough. Brute force attack is characterized in that the number of authentication requests per time becomes extremely high, or many traces of authentication failure are left, and thus unauthorized login attacks have been detected according to the presence or absence of such characteristics, under the conventional technology.

CITATION LIST

Non-Patent Literature

Non-Patent Literature 1: Measures To Deal With Unauthorized Login By List Based Account Hacking (Collection of Measures for Internet Service Providers such as Site Administrators), [online], [Retrieved on Oct. 7, 2014] from the Internet <URL:http://www.soumu.go.jp/main content/000265403.pdf>

Non-Patent Literature 2: How To Protect Oneself From Threats That Are Getting More Sophisticated, such as Advanced Persistent Threat and Unauthorized Login, [online], [Retrieved on Oct. 7, 2014] from the Internet <URL:http://www.atmarkit.co.jp/ait/articles/1406/27/news012.html>

Non-Patent Literature 3: Hiroshi Tokumaru, Systematically Learning How to Make Safe Web Applications, Page 318, SB Creative Corporation, March 2011

Non-Patent Literature 4: Unlocking Lockout of User Account, [online], [Retrieved on Oct. 7, 2014] from the Internet <URL:http://www.atmarkit.co.jp/ait/articles/0311/29/news005.html>

Non-Patent Literature 5: Block Unauthorized Login! Authentication Enhancement by OpenAM, [online], [Retrieved on Oct. 7, 2014] from the Internet <URL:http://www.atmarkit.co.jp/ait/articles/1310/17/news003.html>

SUMMARY

Technical Problem

However, in recent years, list based attacks have been prevalent, in which, based on ID/PWD lists that have been disclosed by information leakage or the like through other companies' services, attack is carried out in expectation of the same IDs/PWDs being used for other services. Such list based attacks have a high probability of succeeding in authentication, and thus even if unauthorized login attack is attempted to be detected by the conventional method of counting up the number of authentications or number of authentication failures per time, there is a risk that the unauthorized login attack may be overlooked. Therefore, an object of the present invention is to solve the above described problem and to detect attacks accurately.

Solution to Problem

To solve the above-described problems, the present invention is an analysis apparatus that analyzes access logs including authentication results and authentication information of users, the analysis apparatus comprising: an extracting unit that groups together, from the access logs, access logs of the same access source; a calculation unit that calculates a similarity between pieces of authentication information in plural access logs of the same access source, from the access logs, and if the calculated similarity is equal to or greater than a predetermined value, presumes that a piece of authentication information of the access logs has been input by a human; and a determination unit that determines that there is a possibility that the access source in the access logs is being an attack source, if an authentication result of any of the plural access logs is authentication failure and the calculation unit presumes that any of the pieces of authentication information of the plural access logs has not been input by a human.

Advantageous Effects of Invention

According to the present invention, attacks are able to be detected accurately.

DESCRIPTION OF EMBODIMENTS

Figure 1:
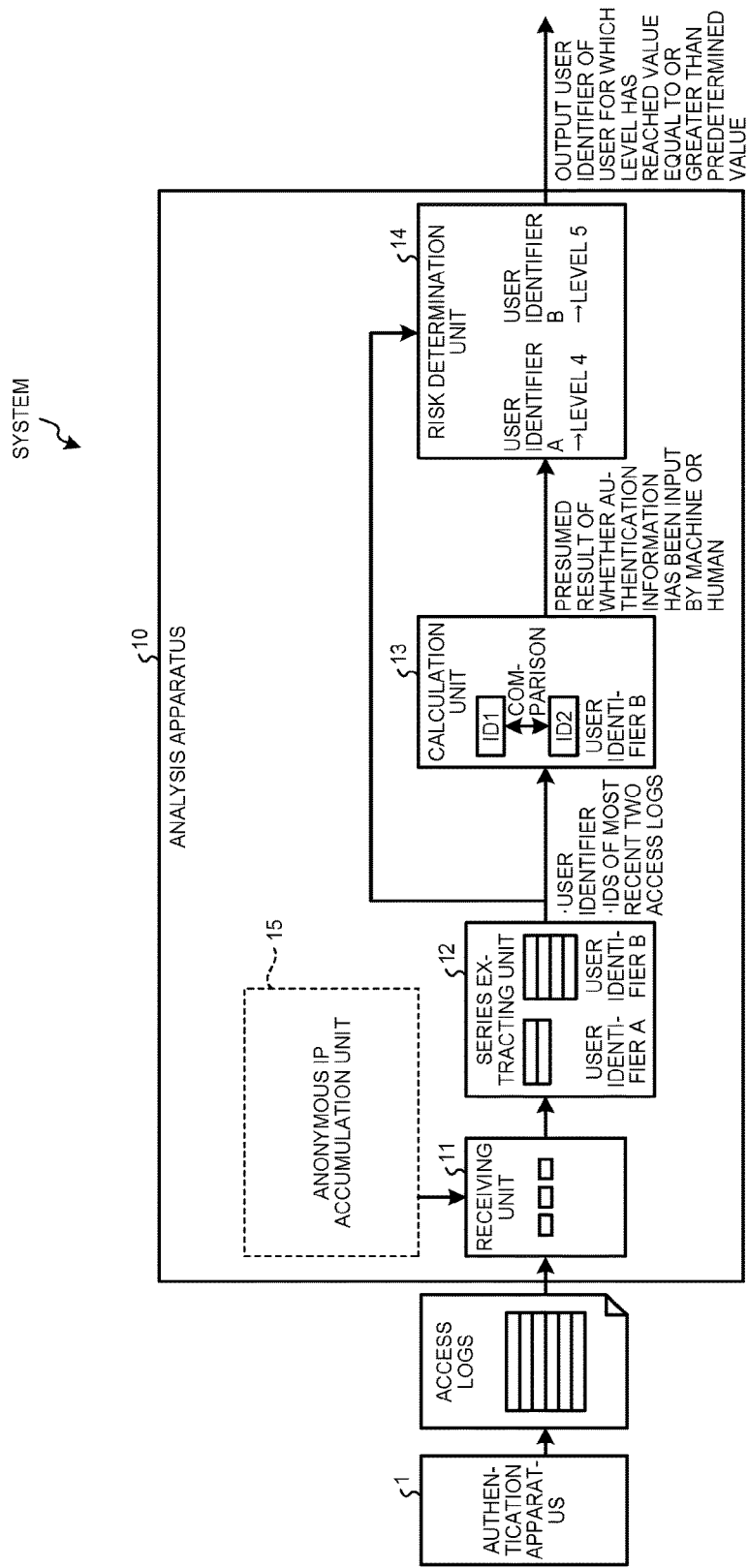
FIG. 1 is a diagram illustrating an example of a configuration of a system.

Hereinafter, with reference to the drawings, modes (embodiments) for carrying out the present invention will be described. The present invention is not limited to these embodiments.

First of all, an example of a configuration of a system according to an embodiment will be described by use of FIG. 1. The system includes an authentication apparatus 1 and an analysis apparatus 10. The authentication apparatus 1 receives access from one or more user terminal devices (illustration thereof omitted), and executes authentication processing. Results of the authentication are recorded as access logs. The analysis apparatus 10 receives the access logs from the authentication apparatus 1 and analyzes the access logs.

These access logs include information, such as IP addresses of terminal devices of access sources (transmission sources), authentication information used in the authentication (for example, IDs and passwords), authentication results, and dates and times of access. The authentication results include: information on whether or not the authentication has succeeded; if the authentication has failed, information on reasons for the failure; and the like. The reasons for failure in the authentication are, for example: account error where the ID or the like used for the authentication is different from the ID or the like that has been registered; password error where the password associated with the ID is different from the password that has been registered; and the like.

(Analysis Apparatus)

The analysis apparatus 10 includes a receiving unit 11, a series extracting unit 12, a calculation unit 13, and a risk determination unit (determination unit) 14. An anonymous IP accumulation unit 15 illustrated with a broken line may be included or may be not included, and the case where the anonymous IP accumulation unit 15 is included will be described later.

The receiving unit 11 receives access logs of each user from the authentication apparatus 1. For example, the receiving unit 11 receives access logs of each user in chronological order from the authentication apparatus 1.

The series extracting unit 12 group together the access logs received by the receiving unit 11 by access source (user). That is, the series extracting unit 12 extracts a series of access logs for each access source. For example, the series extracting unit 12 forms an access log group having the same access source IP address or IP address range (for example, an access log group of a user identifier A and an access log group of a user identifier B in FIG. 1), from a group of the access logs received by the receiving unit 11. If the access source IP address or IP address range is the same, the series extracting unit 12 regards the access log to be of the same user and assigns the same user identifier to the access log.

Figure 2:
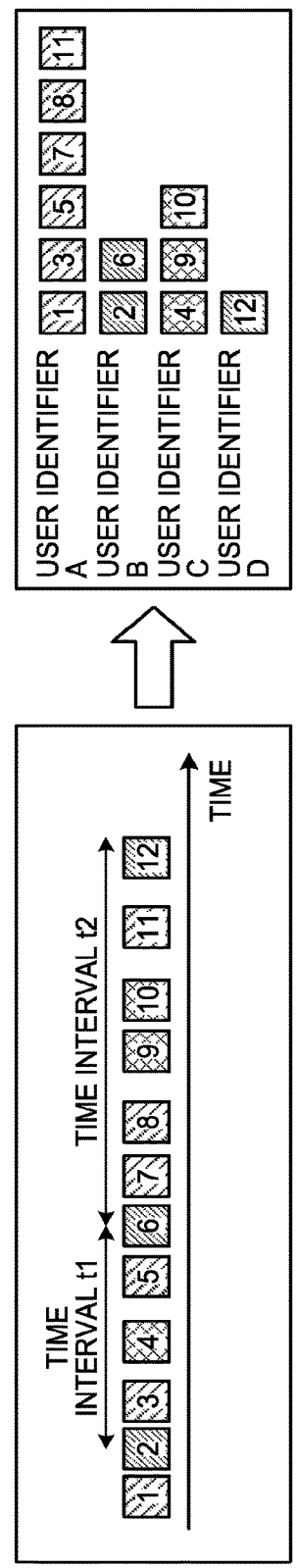
FIG. 2 is a diagram for explanation of a specific example of processing by a series extracting unit.

Even if an access log has the same access source IP address or IP address range, the series extracting unit 12 may group that access log as an access log of another user when the time interval therebetween is equal to or greater than a predetermined value, "t". For example, as illustrated in FIG. 2, for an access log with the same access source IP address or IP address range, from access logs, "1" to "12", the series extracting unit 12 groups that access log as an access log of the same user when the time interval therebetween is less than "t", and groups an access log as an access log of another user (a new user) if the time interval therebetween is equal to greater than "t". For example, in FIG. 2, the access logs, "2", "6", and "12", respectively have the same access source, but if a time interval t1 between the access logs, "2" and "6", is less than "t", and a time interval t2 between the access logs, "6" and "12", is equal to or greater than "t", the access logs, "2" and "6", are grouped together as access logs of the same user (for example, the user identifier B), and the access log, "12", is regarded as an access log of another user (for example, a user identifier D). Thereby, even if the user of the access source IP address or IP address range changes over time, the series extracting unit 12 is able to group the access logs as access logs of different users according to the change.

The calculation unit 13 calculates a similarity between pieces of authentication information (for example, IDs and passwords) of two access logs from access logs of the same user grouped together by the series extracting unit 12. If the calculated similarity is equal to or greater than a predetermined value, the calculation unit 13 presumes that the piece of authentication information in any one access log of these two access logs has been input by a human. On the contrary, if the calculated similarity is less than the predetermined value, the calculation unit 13 presumes that the piece of authentication information in any one access log of these two access logs has not been input by a human, that is, has been input by a machine (for example, by list based attack). The calculation unit 13 may, of course, calculate similarities between pieces of authentication information of three or more access logs of the same user.

For example, from the series extracting unit 12, the calculation unit 13 receives: a user identifier; and IDs included in two access logs that are chronologically consecutive (the most recent two access logs) of a series of access logs of that user identifier. The calculation unit 13 then compares the IDs (ID1 and ID2) included in the most recent two access logs of this user identifier B with each other, and calculates a similarity therebetween. If the calculated similarity is equal to or greater than the predetermined value, the calculation unit 13 presumes that the piece of authentication information has been input by a human, and outputs the presumed result to the risk determination unit 14. On the contrary, if the calculated similarity is less than the predetermined value, the calculation unit 13 presumes that this piece of authentication information has been input by a machine, and outputs the presumed result to the risk determination unit 14. A specific example of this similarity calculation by the calculation unit 13 will be described later.

Based on authentication results of access logs of each user and presumed results for authentication information of the access logs of the user calculated by the calculation unit 13, the risk determination unit 14 determines highness (level) of a possibility that the user is being an attack source. For example, if an authentication result of any one access log of two consecutive access logs of a user's access logs that have been grouped together by the series extracting unit 12 is authentication failure, and the calculation unit 13 presumes that authentication information of any one access log of these two access logs has not been input by a human (that is, has been input by a machine), the risk determination unit 14 determines that a possibility that the user of the access source in these access logs is being the attack source is high.

In a specific example, if an authentication result of any one access log of two consecutive access logs of the same user is authentication failure due to account error and the calculation unit 13 presumes that authentication information of any one access log of these two access logs has been input by a machine, the risk determination unit 14 increases highness (level) of a risk of attack occurring with the user of the access source in these access logs being the attack source. On the contrary, even if an authentication result of any one access log of the two access logs is authentication failure due to account error, if the calculation unit 13 presumes that authentication information of any one access log of these two access logs has been input by a human, the risk determination unit 14 decreases the highness (level) of the risk of the attack occurring with the user of the access source of these access logs being the attack source. The risk determination unit 14 may output a user identifier of a user of an access source, for which the level has been increased consecutively twice (for example, the level has reached "3" or higher from "1"), as a user identifier of a user highly likely to be an attack source. Thereby, an administrator or the like of the system is able to know the user identifier of the user highly likely to be the attack source.

(Specific Example of Calculation of Similarity by Calculation Unit)

Figure 3:
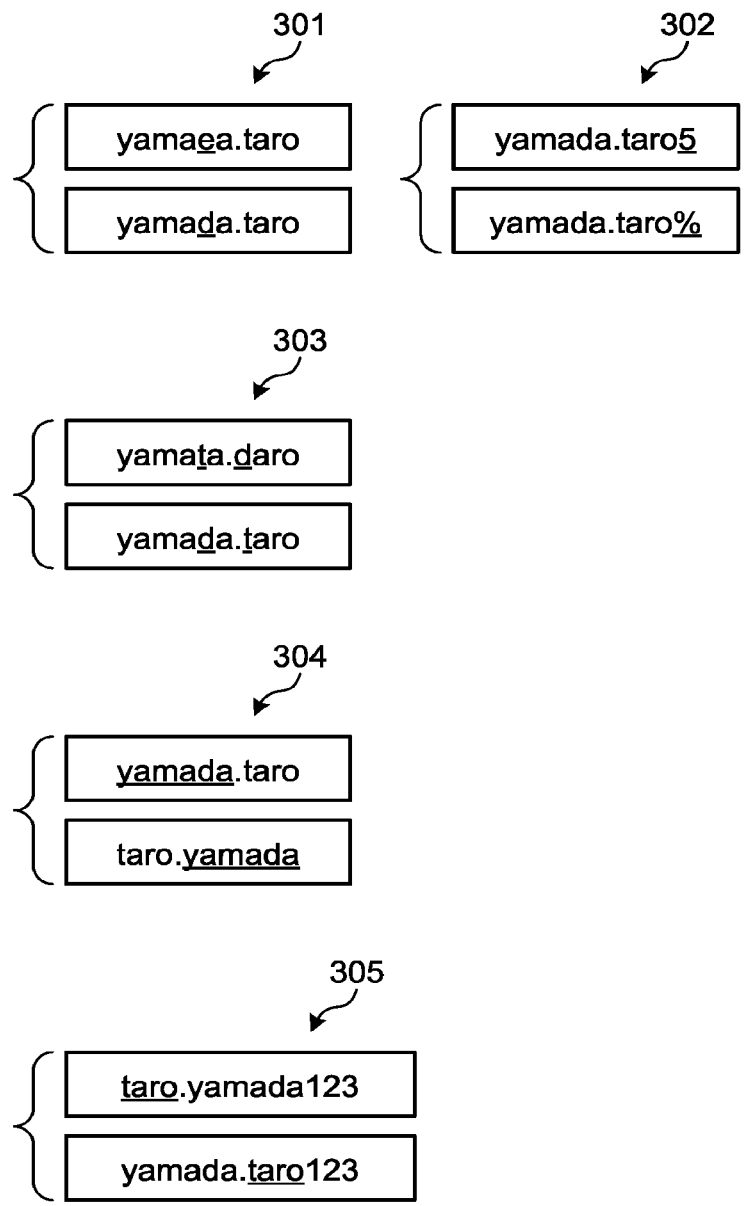
FIG. 3 is a diagram for explanation of a specific example of similarity calculation by a calculation unit in FIG. 1.
Figure 4:
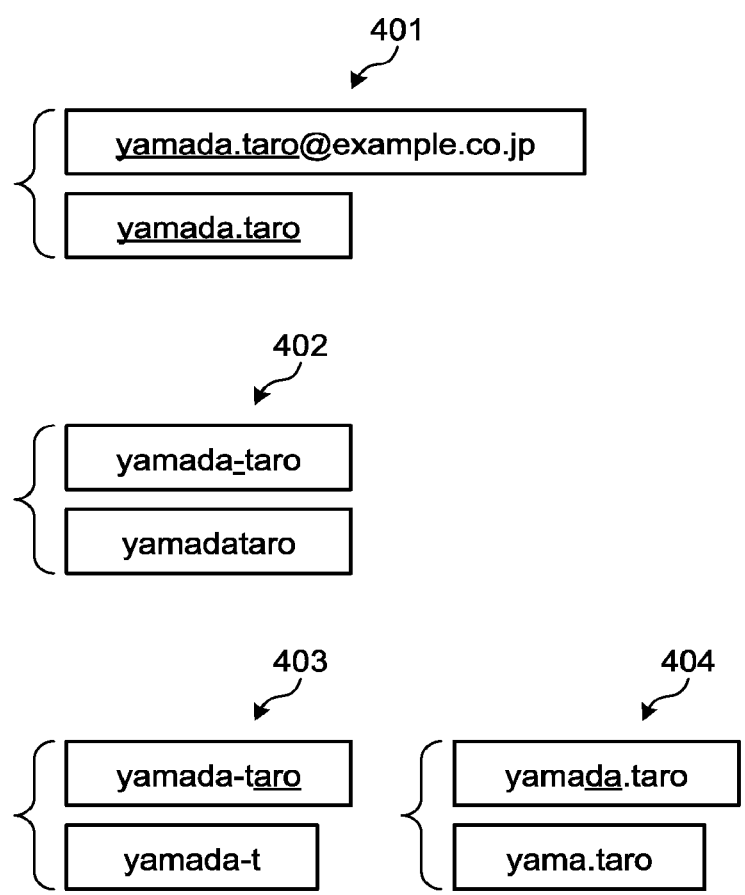
FIG. 4 is a diagram for explanation of a specific example of the similarity calculation by the calculation unit in FIG. 1.

A specific example of similarity calculation by the calculation unit 13 will now be described by use of FIG. 3 and FIG. 4.

For example, between two pieces of authentication information (for example, IDs) to be compared with each other, the nearer the locations of, or the more similar the input operations for, characters, numbers, and symbols composing the respective pieces of authentication information, are to each other on the input device, the more highly the calculation unit 13 calculates the similarity therebetween. For example, between two pieces of authentication information to be compared with each other, the nearer the distance (keyboard distance) between the characters, numbers, and symbols composing the respective pieces of authentication information is on the keyboard layout, the more highly the calculation unit 13 calculates the similarity therebetween. For example, since the keyboard distance between "yamaea.taro" and "yamada.taro" illustrated with a reference numeral 301 in FIG. 3 is comparatively near, the similarity is calculated highly. The difference between uppercase and lowercase or difference between a number and a symbol due to erroneous pressing of the shift key is also regarded as being near in the keyboard distance, and for example, a similarity between "yamada.taro5" and "yamada.taro %" illustrated with a reference numeral 302 is calculated highly, too.

Further, for example, between two pieces of authentication information (for example, IDs) to be compared with each other, the nearer the edit distance between characters, numbers, and symbols composing the respective pieces of authentication information is, the more highly the calculation unit 13 may calculate the similarity therebetween. In this case, for example, since the edit distance between "yamata.daro" and "yamada.taro" illustrated with a reference numeral 303 is comparatively near, the similarity therebetween is calculated highly.

Further, for example, if one piece of authentication information of two pieces of authentication (for example, IDs) to be compared with each other does not include an at-sign (@) and includes one delimiter (for example, a non-alphanumeric symbol, such as an underbar (_) a dot (.), or a hyphen (-)), and the other one of the pieces of authentication information is a character string resulting from interchange between character strings before and after the delimiter of the one piece of authentication information, the calculation unit 13 may calculate the similarity highly, too. In this case, for example, a similarity between "yamada.taro" and "taro.yamada" illustrated with a reference numeral 304 is calculated highly, because the latter piece of authentication information is a character string resulting from interchange between character strings divided by the dot (.) of the former piece of authentication information.

Further, for example, if: each of two pieces of authentication information (for example, IDs) to be compared with each other includes a number at the end thereof, character strings before and after a delimiter in one of the pieces of authentication information with the number omitted therefrom are interchanged, and the interchanged character string with the number added back is the same as the other one of the pieces of authentication information; the calculation unit 13 may calculate the similarity highly. For example, a similarity between "taro.yamada123" and "yamada.taro123" illustrated with a reference numeral 305 is calculated highly, since when the character strings before and after the delimiter in the former piece of authentication information with the number omitted therefrom are interchanged and the number is added back, the obtained character string becomes the same as the latter piece of authentication information. Further, if any one of two pieces of authentication information (for example, IDs) to be compared with each other includes a number at the end thereof, and the one of two pieces of authentication information, from which the number has been deleted, is the same as the other one of the two pieces of authentication information, the calculation unit 13 may calculate the similarity highly. For example, the calculation unit 13 calculates a similarity between "yamada" and "yamada123" highly, since the latter piece of authentication information, from which the number therein has been deleted, is the same as the former piece of authentication information.

Further, for example, if one piece of authentication information of two pieces of authentication (for example, IDs) to be compared with each other does not include an at-sign (@), the other one of the two pieces of authentication information includes an at-sign, and the partial character string up to the at-sign is common to these two pieces of authentication information, the calculation unit 13 may calculate the similarity highly. In this case, for example, a similarity between "yamada.taro@example.co.jp" and "yamada.taro" illustrated with a reference numeral 401 in FIG. 4 is calculated highly, since the partial character string up to the at-sign of the former matches the other.

Further, for example, if one piece of authentication information of two pieces of authentication information (for example, IDs) to be compared with each other includes two or less symbols other than consecutive alphanumeric symbols and the one piece of authentication information matches the other piece of authentication information when the two or less symbols are removed from the one piece of authentication information, the calculation unit 13 may calculate the similarity highly. In this case, for example, a similarity between "yamada-taro" and "yamadataro" is calculated highly, since when the symbol (hyphen (-)) is removed from the former, the former matches the latter.

Further, for example, if one piece of authentication information of two pieces of authentication information (for example, IDs) to be compared with each other includes one non-alphanumeric symbol, and when the partial character string before or after the symbol is partially omitted, the obtained character string matches the other one of the two pieces of authentication information, the calculation unit 13 may calculate the similarity highly. In this case, for example, a similarity between "yamada-taro" and "yamada-t" illustrated with a reference numeral 403 in FIG. 4, or between "yamada.taro" and "yama.taro" illustrated with a reference numeral 404, is calculated highly, because when the partial character string before or after the symbol is partially omitted, the obtained character string matches the other piece of authentication information. Furthermore, in such a case where one of pieces of authentication information includes one non-alphanumeric symbol; if, when the partial character string before or after the symbol is partially omitted and the obtained partial character strings before and after the symbol are interchanged, the obtained character string matches the other piece of authentication information, the similarity may be calculated highly, too.

As described above, even if two pieces of authentication information to be compared with each other are different from each other, if the difference between these two pieces of authentication information has a pattern that is typical in input errors by humans, the calculation unit 13 calculates a similarity between these pieces of authentication information highly. Patterns, for which the similarity between pieces of authentication information to be compared with each other is determined by the calculation unit 13 highly (that is, patterns typical in human input errors), may, for example, be stored in a predetermined area of a storage unit (illustration thereof omitted) of the analysis apparatus 10, and be modified as appropriate by an administrator or the like of the analysis apparatus 10.

(Specific Example of Level Determination by Risk Determination Unit)

A specific example of level determination by the risk determination unit 14 will now be described by use of FIG. 5. Based on a state transition diagram illustrated in FIG. 5, the risk determination unit 14 increases level when behavior similar to list based attack (login using authentication information input by a machine, or the like) is observed in an access log, and decreases the level when behavior not similar to list based attack (login using authentication input by a human, or the like) is observed therein. Specifically, for example, based on success or failure of authentication in a series of access logs of an access source IP address=A, a cause (reason) of authentication failure, and a presumed result for input authentication information (whether the authentication information has been input by a human or input by a machine), the risk determination unit 14 determines highness (threat level) of a risk of attack occurring with a user of the access source IP address=A being an attack source, according to five levels. Thereby, erroneous detection of attack is able to be prevented, and determination that there is a possibility of success in list based attack is able to be made.

Of the above mentioned five levels, a level 1 indicates a "normal IP address", level 2 indicates "caution", level 3 indicates that "possibility of list based attack is high", level 4 indicates that "list based attack is ongoing", and level 5 indicates that "possibility of success in list based attack is extremely high".

Figure 5:
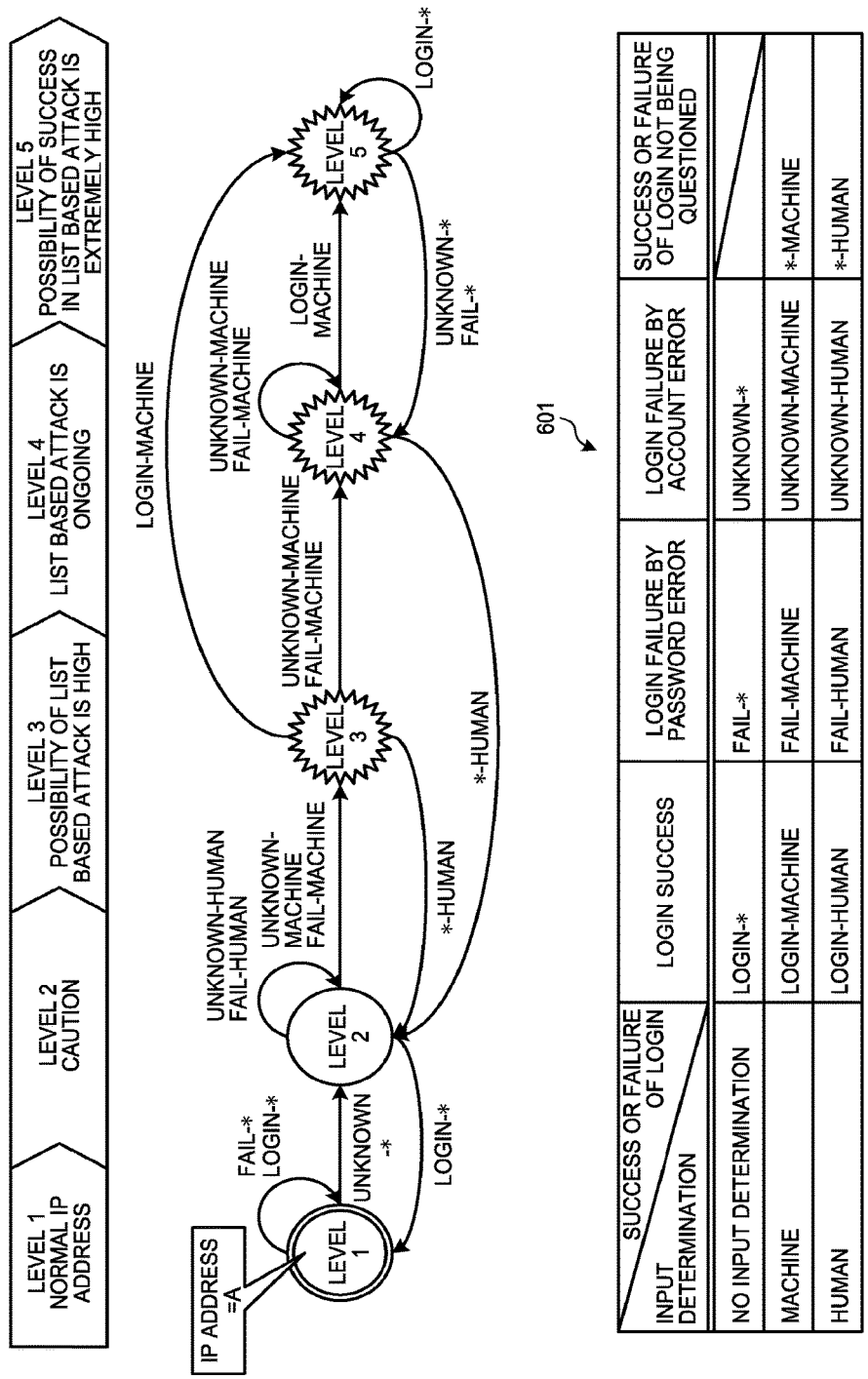
FIG. 5 is a diagram for explanation of a specific example of level determination by a risk determination unit in FIG. 1.

An upper diagram in FIG. 5 is a state transition diagram illustrating an example of the level determination by the risk determination unit 14. Nodes in this state transition diagram represent levels (level 1 to level 5), and arrows (edges) connecting between the nodes represent events for transition to the respective states. An event is described with, for example, as illustrated with a reference numeral 601, a combination of success or failure of the login, and a determination result (input determination) of whether the authentication information has been input by a machine or by a human. Success or failure of the login is any one of login success (LOGIN), login failure due to password error (FAIL), login failure due to account error (UNKNOWN), and success or failure of login not being questioned (*). Further, the determination result of whether the authentication information has been input by a machine or by a human is any one of: whether the authentication information has been input by a machine or by a human being not questioned (no input determination) (*); machine (MACHINE); and human (HUMAN). For example, "LOGIN-*" indicates that whether the authentication information has been input by a machine or a human is not questioned, and the login has succeeded. Furthermore, "FAIL-MACHINE" indicates that the login has failed due to password error, and the authentication information has been input by a machine. Moreover, "*-MACHINE" indicates that success or failure of the login is not questioned, and the authentication information has been input by a machine.

Next, the state transition diagram in FIG. 5 will be described. Firstly, the risk determination unit 14 refers to the first access log of the access source IP address=A, and if the event is "FAIL-*" or "LOGIN-*", determines the level to be still at the level 1, and if the event is "UNKNOWN-*", determines the level to be at the level 2.

Subsequently, the risk determination unit 14 refers to the next access log of the access source IP address=A, for which the level has been determined to be at the level 2, and if the event is "UNKNOWN-HUMAN" or "FAIL-HUMAN", determines the level to be still at the level 2, and if the event is "LOGIN-*", determines to return the level back to level 1. On the contrary, if the event is "UNKNOWN-MACHINE" or "FAIL-MACHINE", the level is determined to be at the level 3.

Subsequently, the risk determination unit 14 refers to the next access log of the access source IP address=A, for which the level has been determined to be at the level 3, and if the event is "UNKNOWN-MACHINE" or "FAIL-MACHINE", determines the level to be at the level 4, and if the event is "LOGIN-MACHINE", determines the level to be at the level 5. On the contrary, if the event is "*-HUMAN", the level is determined to be returned back to the level 2.

Subsequently, the risk determination unit 14 refers to the next access log of the access source IP address=A, for which the level has been determined to be at the level 4, and if the event is "UNKNOWN-MACHINE" or "FAIL-MACHINE", determines the level to be still at the level 4, and if the event is "LOGIN-MACHINE", determines the level to be at the level 5. On the contrary, if the event is "*-HUMAN", the level is determined to be returned back to the level 2.

Subsequently, the risk determination unit 14 refers to the next access log of the access source IP address=A, for which the level has been determined to be at the level 5, and if the event is "LOGIN-*", determines the level to be still at the level 5, and if the event is "UNKNOWN-*" or "FAIL-*", determines to return the level back to level 4.

As described above, every time the risk determination unit 14 finds an access log, for which the authentication information is presumed to have been input by a machine, for example, the risk determination unit 14 increases highness (level) of a risk of attack occurring with the access source IP address of that access log being the attack source, and every time the risk determination unit 14 finds an access log, for which the authentication information is presumed to have been input by a human, the risk determination unit 14 decreases the highness (level) of the risk of the attack occurring with the access source IP address being the attack source. That is, every time the risk determination unit 14 finds, in a series of access logs, a characteristic typical in list based attack, the risk determination unit 14 increases highness (level) of a risk of attack of the access source of that access log, and if the risk determination unit 14 does not find a characteristic typical in list based attack, the risk determination unit 14 decreases the highness (level) of the risk of the attack of that access source.

As a result of the above described level determination, the risk determination unit 14 then outputs, for example, the IP address (user identifier), for which the level has become equal to or greater than the level 3, as a user identifier of a user that is highly likely to be the attack source. Thereafter, the analysis apparatus 10 may output an alert to the terminal of the IP address, or notify the authentication apparatus 1 or the like of the IP address as a target to be blocked. Further, if an event does not occur for a predetermined time period or longer during state transition to the respective nodes of the state transition diagram illustrated in FIG. 5, the risk determination unit 14 may reset the level to the level 1.

(Processing Sequence)

Figure 6:
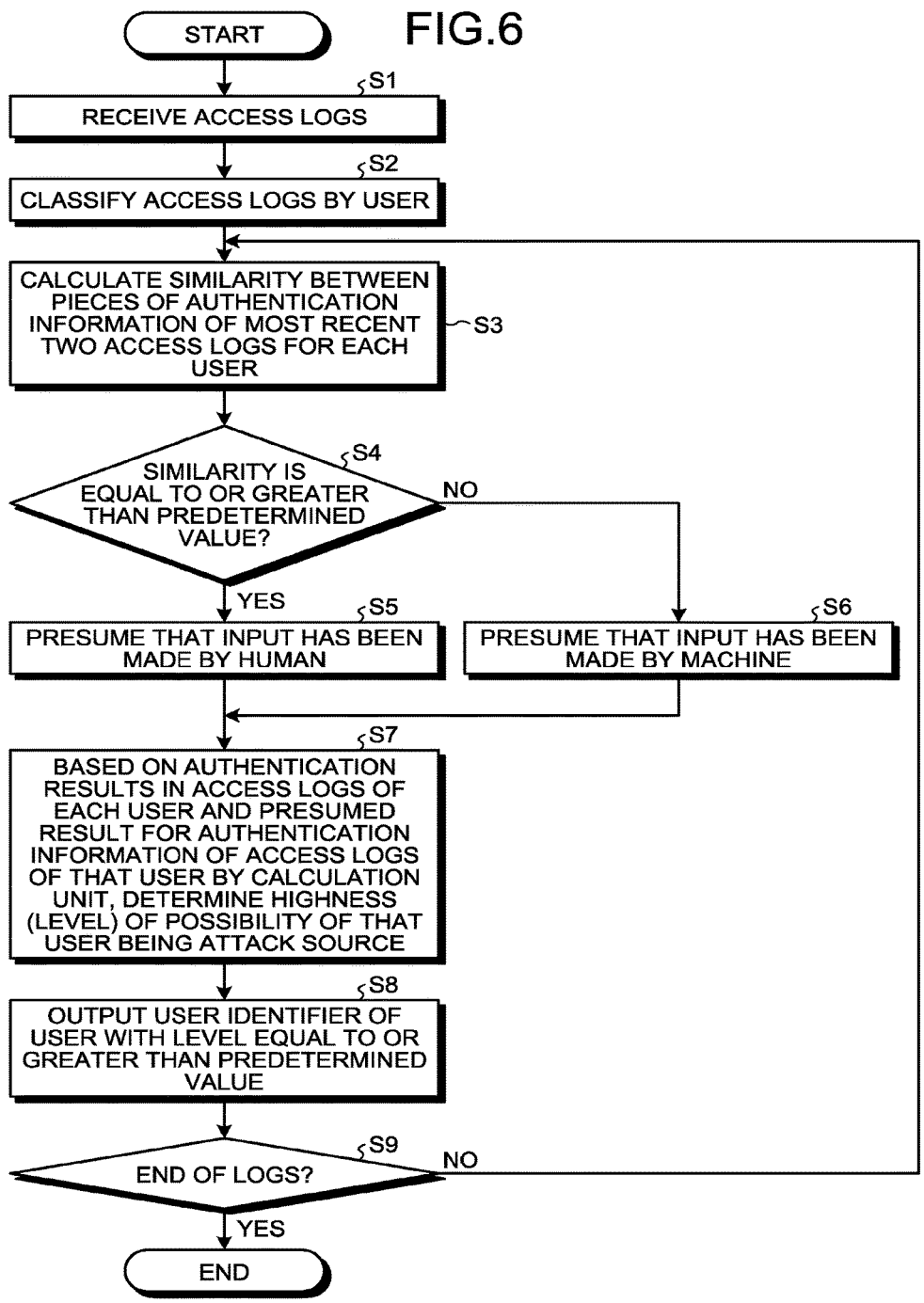
FIG. 6 is a flow chart illustrating a processing sequence by an analysis apparatus in FIG. 1.

Next, a processing sequence by the analysis apparatus 10 will be described by use of FIG. 6.

Firstly, the receiving unit 11 receives access logs from the authentication apparatus 1 (S1), and classifies the access logs received by the receiving unit 11 by user (S2). For example, from the group of access logs received by the receiving unit 11, the series extracting unit 12 groups together access logs having the same access source IP address or IP address range.

Subsequently, for the access logs that have been classified by user at S2, the calculation unit 13 calculates a similarity between pieces of authentication information of the most recent two access logs for each user (S3). For example, the calculation unit 13 calculates a similarity between pieces of authentication information included in two access logs that are chronologically consecutive, for each user, by the method illustrated in FIG. 3 and FIG. 4.

If the similarity calculated by the calculation unit 13 is equal to or greater than a predetermined value (S4; Yes), a piece of authentication information included in those access logs is presumed to have been input by a human (S5), and if the similarity is less than the predetermined value (S4; No), a piece of authentication information included in those access logs is presumed to have been input by a machine (S6). The calculation unit 13 then outputs the presumed result to the risk determination unit 14.

Thereafter, based on an authentication result in the access logs of each user classified by the series extracting unit 12 and the presumed result for the piece of authentication information of the access logs of the user by the calculation unit 13, the risk determination unit 14 determines highness (level) of a possibility that the user is being the attack source (S7). For example, by the method illustrated in FIG. 5, the risk determination unit 14 determines highness (level) of a risk of attack occurring with each user being the attack source.

The risk determination unit 14 then outputs a user identifier of a user, for which the level determined at S7 is equal to or greater than a predetermined value (S8). For example, the risk determination unit 14 outputs user identification information of a user, for which the level determined by the method illustrated in FIG. 5 is equal to or greater than "3". Further, after S8, if there are any access logs, for which a similarity has not been calculated, in the access logs that have been classified by user at S2 (S9; No for "end of logs?"), the processing is returned to S3. On the contrary, if similarities have been calculated for all of the access logs that have been classified by user at S2 (S9; Yes for "end of logs?"), the processing is ended. The analysis apparatus 10 executes the above described processing for access logs of each user classified at S2. The analysis apparatus 10 may process the access logs of the respective users in order, or may process the access logs of the respective users concurrently. In this case, the analysis apparatus 10 includes plural calculation units 13 and risk determination units 14 according to the concurrency.

Accordingly, even if list based attack is being executed, the analysis apparatus 10 is able to detect the list based attack. Specifically, the analysis apparatus 10 is able to output highness (level) of a possibility that each user is being an attack source of list based attack, or a user identifier of a user highly likely to be an attack source of list based attack. Further, since the analysis apparatus 10 uses success or failure of authentication, a reason of authentication failure, and a presumed result for input of authentication information, in detection of attack, even if an attacker slows down the trial frequency of login in order to disguise the login as normal login, it becomes easier for the analysis apparatus 10 to detect the attack.

Other Embodiments

The analysis apparatus 10 may further include the anonymous IP accumulation unit 15 illustrated in FIG. 1. This anonymous IP accumulation unit 15 accumulates therein IP addresses, each of which is highly likely to be used among plural users. The receiving unit 11 removes, from access logs received from the authentication apparatus 1, any access log of an IP address or IP address range that is the same as the IP address accumulated in the anonymous IP accumulation unit 15, and outputs them to the series extracting unit 12. By the receiving unit 11 executing such processing, the series extracting unit 12 is able to group together an access log group from the same user, based on the IP addresses or IP address ranges of the access sources in the access logs.

An IP address (anonymous IP address) accumulated in this anonymous IP accumulation unit 15 is, for example, an IP address that is used for The Onion Router (Tor), a proxy server, a mobile carrier, a public access point, or the like.

Figure 7:
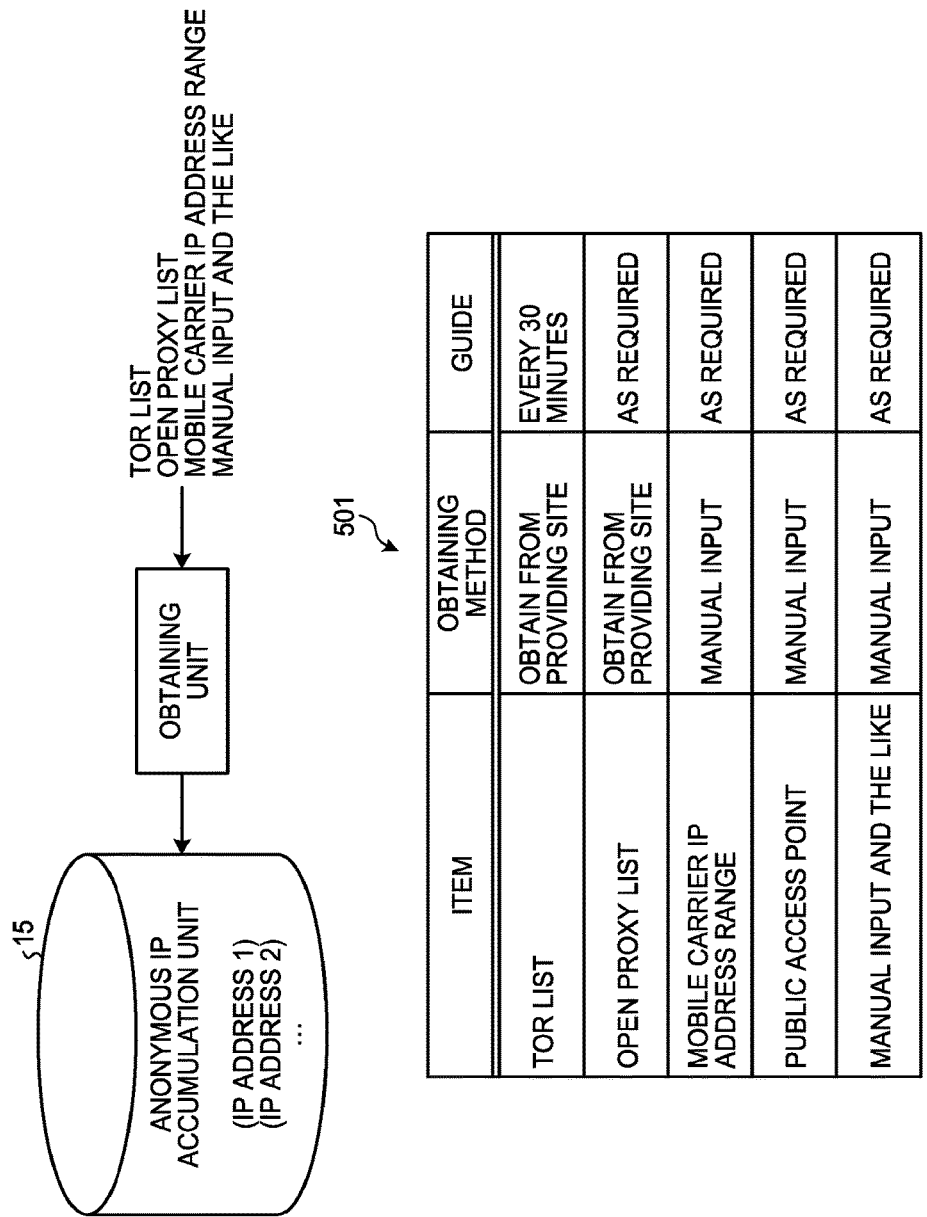
FIG. 7 is a diagram for explanation of an anonymous IP accumulation unit in FIG. 1.

An anonymous IP address accumulated in this anonymous IP accumulation unit 15 is, for example, as illustrated in FIG. 7, obtained by an obtaining unit (illustration thereof omitted in FIG. 1) through a Tor list, an open proxy list, a mobile carrier IP address range, other manual input, or the like, and accumulated therein. Further, the obtaining unit may obtain these IP addresses by an obtaining method and at time intervals, which have been determined for each IP address obtainment source.

For example, the obtaining unit refers to anonymous IP address obtainment information illustrated with a reference numeral 501 in FIG. 7, obtains IP addresses (a list of IP addresses) every 30 minutes from a providing site of a Tor list, and accumulates the IP addresses in the anonymous IP accumulation unit 15. Further, the obtaining unit refers to the anonymous IP address obtainment information illustrated with the reference numeral 501 in FIG. 7, obtains IP addresses (a list of IP addresses) by manual input as required from a mobile carrier IP address range, and accumulates the IP addresses in the anonymous IP accumulation unit 15.

(Program)

Further, a program, which describes the processing executed by the analysis apparatus 10 according to the above described embodiment in a language executable by a computer, may be generated and executed. In this case, by the computer executing the program, effects that are the same as those of the above described embodiment are able to be obtained. Further, by recording this program in a computer readable recording medium, and causing the computer to load and execute the program recorded in this recording medium, processing that is the same as that of the above described embodiment may be realized. Hereinafter, an example of a computer, which executes an analysis program that realizes functions that are the same as those of the analysis apparatus 10, will be described.

Figure 8:
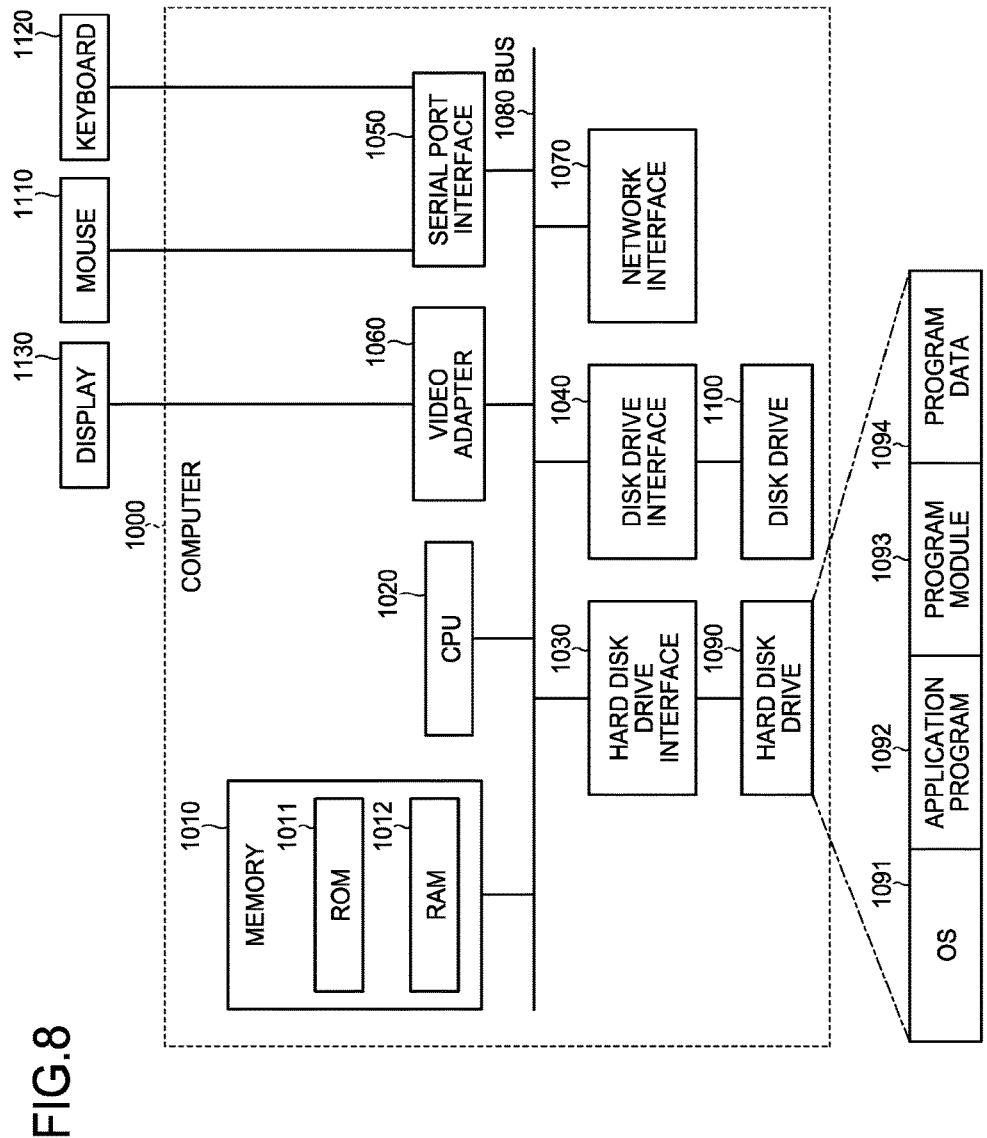
FIG. 8 is a diagram illustrating a computer that executes an analysis program.

FIG. 8 is a diagram illustrating the computer that executes the analysis program. As illustrated in FIG. 8, a computer 1000 has, for example, a memory 1010, a central processing unit (CPU) 1020, a hard disk drive interface 1030, a disk drive interface 1040, a serial port interface 1050, a video adapter 1060, and a network interface 1070. These units are connected to one another via a bus 1080.

The memory 1010 includes a read only memory (ROM) 1011 and a random access memory (RAM) 1012. The ROM 1011 stores therein a boot program, such as Basic Input Output System (BIOS), for example. The hard disk drive interface 1030 is connected to a hard disk drive 1090. The disk drive interface 1040 is connected to a disk drive 1100. An attachable and detachable storage medium, such as a magnetic disk or an optical disk, for example, is inserted in the disk drive 1100. A mouse 1110 and a keyboard 1120, for example, are connected to the serial port interface 1050. A display 1130, for example, is connected to the video adapter 1060.

As illustrated in FIG. 8, the hard disk drive 1090 stores therein, for example, an OS 1091, an application program 1092, a program module 1093, and program data 1094.

Further, the analysis program is stored as a program module, for example, in which commands executed by the computer 1000 are described, in the hard disk drive 1090. Specifically, a program module, in which the processing executed by the analysis apparatus 10 described in the above embodiment is described, is stored in the hard disk drive 1090.

Further, data used in information processing by the analysis program are stored as program data in, for example, the hard disk drive 1090. The CPU 1020 loads the program module 1093 and the program data 1094 stored in the hard disk drive 1090 as necessary into the RAM 1012, and executes the above described sequences.

The program module 1093 and the program data 1094 related to the analysis program are not necessarily stored in the hard disk drive 1090, and for example, may be stored in an attachable and detachable storage medium and read out by the CPU 1020 via the disk drive 1100 or the like. Or, the program module 1093 and the program data 1094 related to the analysis program may be stored in another computer connected via a network, such as a local area network (LAN) or a wide area network (WAN), and read out by the CPU 1020 via the network interface 1070.

REFERENCE SIGNS LIST

1 AUTHENTICATION APPARATUS
10 ANALYSIS APPARATUS
11 RECEIVING UNIT
12 SERIES EXTRACTING UNIT
13 CALCULATION UNIT
14 RISK DETERMINATION UNIT
15 ANONYMOUS IP ACCUMULATION UNIT

The invention claimed is:

1. An analysis apparatus that analyzes access logs including authentication results and authentication information of users, the analysis apparatus comprising:
processing circuitry configured to
group together, from the access logs, access logs of the same access source;
calculate a similarity between pieces of authentication information in plural access logs of the same access source, from the access logs, and if the calculated similarity is equal to or greater than a predetermined value, presumes that a piece of authentication information of the access logs has been input by a human; and
determine that there is a possibility that the access source in the access logs is being an attack source, if an authentication result of any of the plural access logs is authentication failure and the processing circuitry presumes that any of the pieces of authentication information of the plural access logs has not been input by a human.

2. The analysis apparatus according to claim 1, wherein the processing circuitry calculates a similarity between pieces of authentication information in chronologically consecutive plural access logs of the same access source.

3. The analysis apparatus according to claim 1, wherein from the access logs of the same access source, the processing circuitry groups together, as access logs of the same access source, access logs having a time interval therebetween, the time interval being less than a predetermined time period, and groups an access log having a time interval therefrom, the time interval being equal to or greater than the predetermined time period, as an access log of a new access source.

4. The analysis apparatus according to claim 1, wherein from the access logs, the processing circuitry executes processing of grouping together access logs excluding any access log that has an IP address highly likely to be used by plural users as a transmission source.

5. The analysis apparatus according to claim 1, wherein the nearer arrangement positions of: a character, a number, or a symbol; and a character, a number, or a symbol, that are different between the pieces of authentication information, for which the similarity is calculated, are to each other on an input device, the more highly the processing circuitry calculates the similarity.

6. The analysis apparatus according to claim 1, wherein the processing circuitry determines that there is a possibility that the access source is being an attack source, if, for access logs of the same access source, authentication results of any of the plural access logs are authentication failure consecutively twice or more and the processing circuitry has presumed that any of the pieces of authentication information of the plural access logs has not been input by a human.

7. An analysis system comprising: an authentication apparatus that generates access logs including authentication results and authentication information of users; and an analysis apparatus that analyzes the access logs, wherein
the analysis apparatus comprises:
processing circuitry configured to
group together, from the access logs, access logs of the same access source;
calculate a similarity between pieces of authentication information in plural access logs of the same access source, from the access logs, and if the calculated similarity is equal to or greater than a predetermined value, presumes that a piece of authentication information of the access logs has been input by a human; and
determine that there is a possibility that the access source in the access logs is being an attack source, if an authentication result of any of the plural access logs is authentication failure and the processing circuitry presumes that any of the pieces of authentication information of the plural access logs has not been input by a human.

8. An analysis method executed by an analysis apparatus that analyzes access logs including authentication information of users, the analysis method including:
a step of grouping together, from the access logs, access logs of the same access source;
a step of calculating a similarity between pieces of authentication information in plural access logs of the same access source, from the access logs, and if the calculated similarity is equal to or greater than a predetermined value, presuming that a piece of authentication information of the access logs has been input by a human; and a step of determining that there is a possibility that the access source in the access logs is being an attack source, if an authentication result of any of the plural access logs is authentication failure and any of the pieces of authentication information of the plural access logs is presumed to have not been input by a human.

9. A non-transitory computer readable storage medium having stored therein an analysis program causing a computer to execute a process comprising:
   a step of grouping together access logs of the same source, from access logs including authentication results and authentication information of users;
   a step of calculating a similarity between pieces of authentication information in plural access logs of the same access source, from the access logs, and if the calculated similarity is equal to or greater than a predetermined value, presumes that a piece of authentication information of the access logs has been input by a human; and
   a step of determining that there is a possibility that the access source in the access logs is being an attack source, if an authentication result of any of the plural access logs is authentication failure and the calculation unit presumes that any of the pieces of authentication information of the plural access logs has not been input by a human.

* * * * *